Feb. 1, 1966 W. K. BERTHOLD ETAL 3,232,225
MECHANISM FOR HANDLING AND STENCILING INDICIA ON ARTICLES
Filed Aug. 24, 1962 5 Sheets-Sheet 2

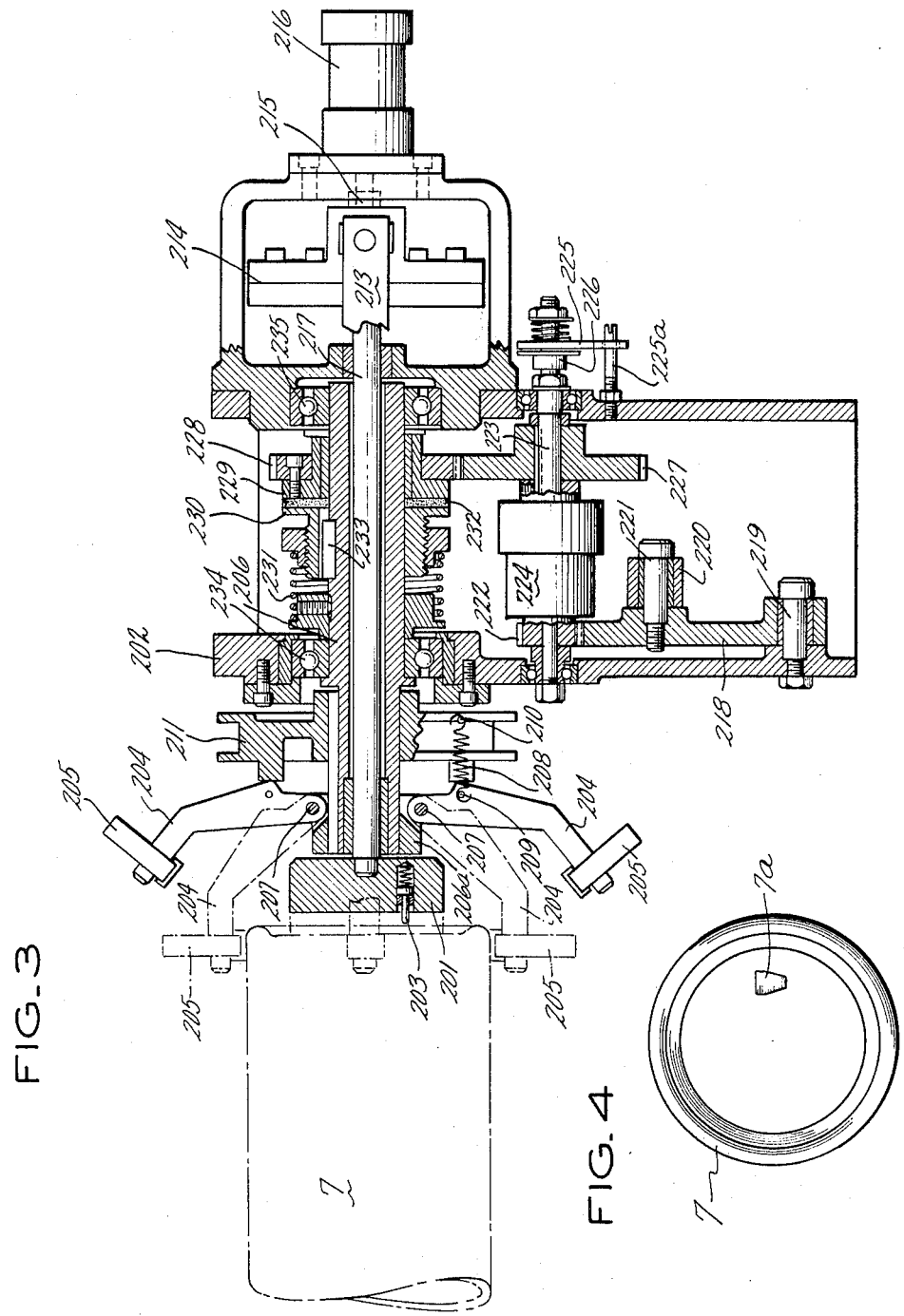

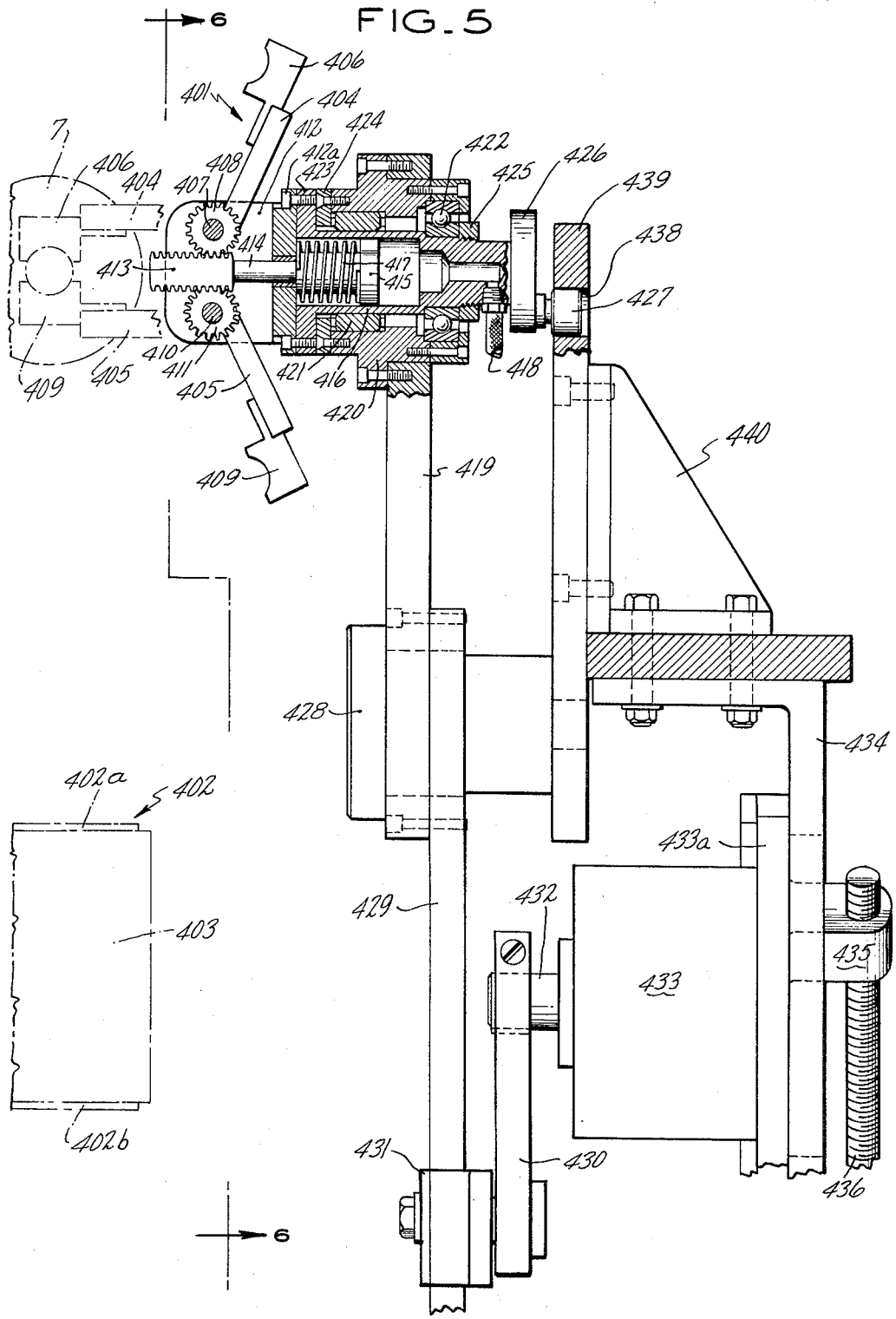

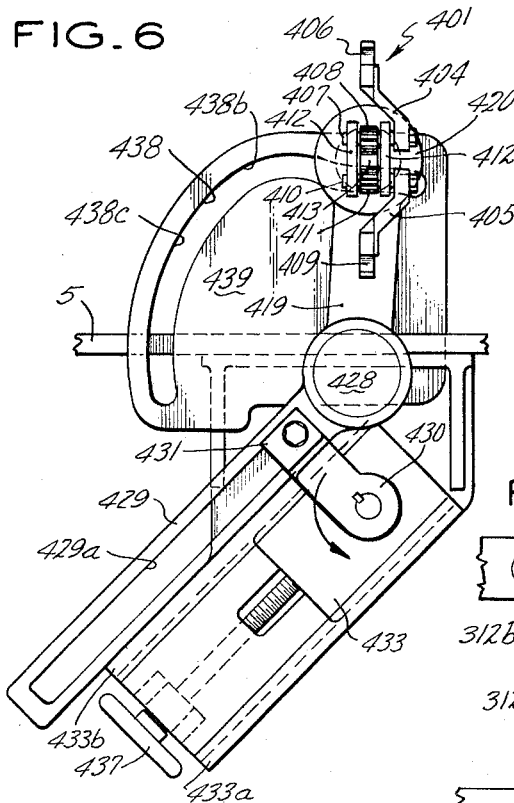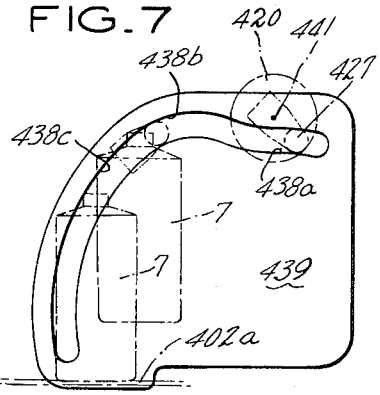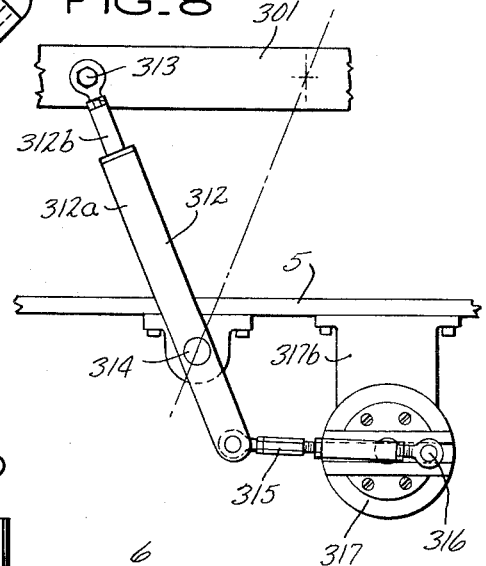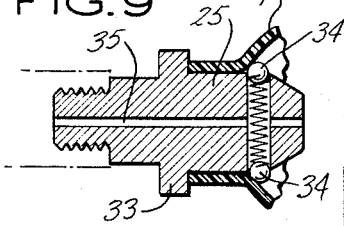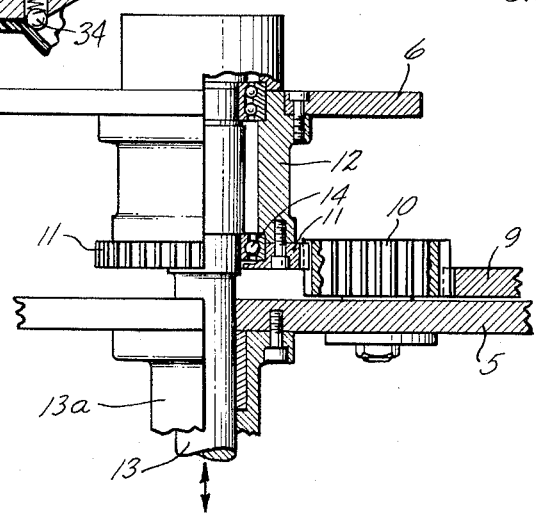

United States Patent Office 3,232,225
Patented Feb. 1, 1966

3,232,225
MECHANISM FOR HANDLING AND STENCILING INDICIA ON ARTICLES
Walter K. Berthold, Rockville, and Michael D. Adamo, Old Lyme, Conn., assignors, by mesne assignments, to Monsanto Company, a corporation of Delaware
Filed Aug. 24, 1962, Ser. No. 219,210
16 Claims. (Cl. 101—124)

This invention pertains to an automatic mechanism for handling and forming indicia on articles. In particular, it relates to a unique, horizontally-rotating and vertically-translatable turret for transporting articles between radially disposed loading, indicia-forming and unloading stations. Also of concern are a transfer mechanism for moving articles from the turret to a conveyer after they have received indicia and an article registration mechanism.

Automatic, indicia-forming or printing mechanisms are well known. However, the previously developed mechanisms have been cumbersome and bulky in nature and the various operating components difficult to coordinate. In addition, these mechanisms have frequently been difficult to adapt to the forming of indicia on articles of different sizes and shapes. Furthermore, these structures have often been so structurally arranged as to make many operating components virtually inaccessible, such that their direct observation, adjustment and maintenance was difficult or impossible. The generally complex structural character of these mechanisms frequently made difficult or impossible the obtaining of high rates of article handling while maintaining accurate indicia formation.

Recognizing the need for an improved article-supplying, article-printing, and article-transferring mechanism, it is an object of this invention to provide such a mechanism which obviates the common disadvantages associated with prior art structures whereby greater efficiency in indicia forming and article handling is achieved.

In particular, it is an object of this invention to confine the manipulative movements of the feeding, indicia-forming and article transferring operations primarily to a horizontal direction so as to improve the accessibility of components and minimize the vertical dimensions of the over-all mechanism.

It is a further object of the invention to provide an improved structure whereby the various operating components of the article-feeding, indicia-forming and transferring components may be more readily observed, coordinated, and adjusted.

It is an additional object of the invention to provide an apparatus wherein the manipulative steps with respect to an article to be fed, printed and moved out of the system are minimized and so systemized as to substantially increase the speed of the over-all operation.

It is an additional object of the invention to minimize the complexity of the article feeding, indicia-forming and transferring components of the apparatus whereby the operating life of the components is extended and maintenance substantially reduced.

Further objects of the invention are to provide a transfer mechanism which will readily accommodate to the transfer of different sized articles from one portion of the system to a conveyer and to provide a compact article registration mechanism which will achieve accurate and rapid article registration without interfering with a main article supporting and transporting structure.

The optimum advantages of the invention are realized with an apparatus including a turret having a vertical axis of rotation. A plurality of article supports are circumferentially spaced on the turret. Each article support comprises a mandrel having an axis which extends horizontally in a plane radial to the turret to receive and discharge an article. A plunger is mounted for horizontal reciprocating movement relative to the turret for pushing an article axially of and onto a mandrel of an article support. The apparatus may further include means for engaging the free end of an article supported on a mandrel to cause its rotation and registration means for engaging the free end of thes article to interrupt this rotation when the article has attained a predetermined position suitable to receive indicia.

Silk screen printing means are positioned above the movement path of articles carried by the mandrel of the article supports. Means are provided for elevating the turret to bring an article carried by a mandrel into indicia-forming contact with the printing means and for lowering the turret after indicia have been printed on an article. Additional means are included for rotating an article supported on a mandrel, with its axis aligned in a plane extending radially of the turret, after the turret has been raised to bring the article into indicia-forming contact with the printing means. Brake means associated with each mandrel are adapted to prevent rotation of an article carried thereon during turret advancement. Brake releasing means are provided which are operable in response to the elevating of said turret so as to permit the rotation of articles during the indicia-forming and registration operations. Article unloading means are included for engaging an article supported on a mandrel to move it axially off of the mandrel.

The contemplated article unloading means includes an arm means mounted for swinging movement between a mandrel on the turret and an article conveyer. Article gripping means are carried on the arm means. Support means are provided for the article gripping means, which support means are journaled in the arm means. Such support means include a crank arm which has a cam follower. A stationary cam engages the cam follower. The stationary cam has a portion adapted to tilt the crank arm ninety degrees, while the arm means moves through an acute angle, to incline the article ninety degrees into a vertical orientation.

In describing the invention reference will be made to preferred embodiments of the various operating components, as illustrated in the accompanying drawings. In these drawings:

FIG. 3 is a partially sectioned view of the article-registration component taken along the line 3—3 of FIGURE 1;

FIG. 4 is an end view of a bottle to be printed, illustrating a registration notch;

FIG. 5 is a partially sectioned view of the article transfer component of the system taken along the line 5—5 of FIGURE 1;

FIG. 6 is an elevational view of the article transfer component of the system illustrated in FIGURE 1 as viewed along the line 6—6 of FIGURE 5;

FIG. 7 is an elevational view of the cam included in the transfer mechanism shown in FIGURE 6;

FIG. 8 is a sectional view taken along the line 8—8 of FIGURE 1 which illustrates the mechanism for actuating the printing component of the system;

FIG. 9 is a partially sectioned view of the article supported on a turret mandrel as taken along the line 9—9 of of FIGURE 1; and FIG. 10 is an enlarged, partially sectioned, view of the turret rotating and elevating mechanism as viewed along the line 10—10 of FIGURE 1.

Figure 1:
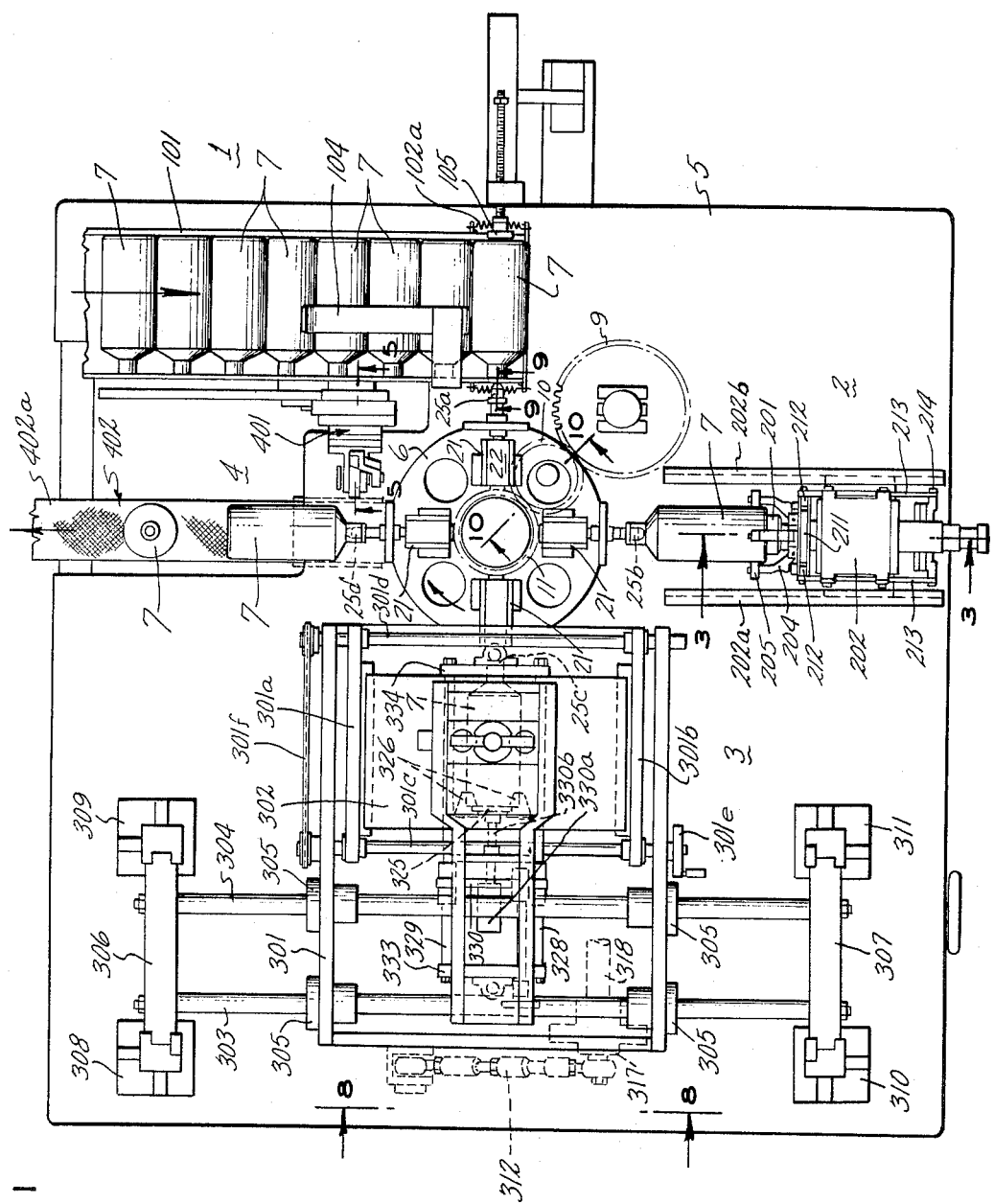
FIG. 1 is a plan view of the over-all system, including the article-feeding, article-registration, article-printing, and article-transferring components.

The over-all mechanism illustrated in FIGURE 1 in-includes an article feeding station 1, an article registration station 2, an article printing station 3, and an article transfer station 4. All stations are supported on a frame 5 and radially disposed about a centraly positioned turret 6.

Figure 2:
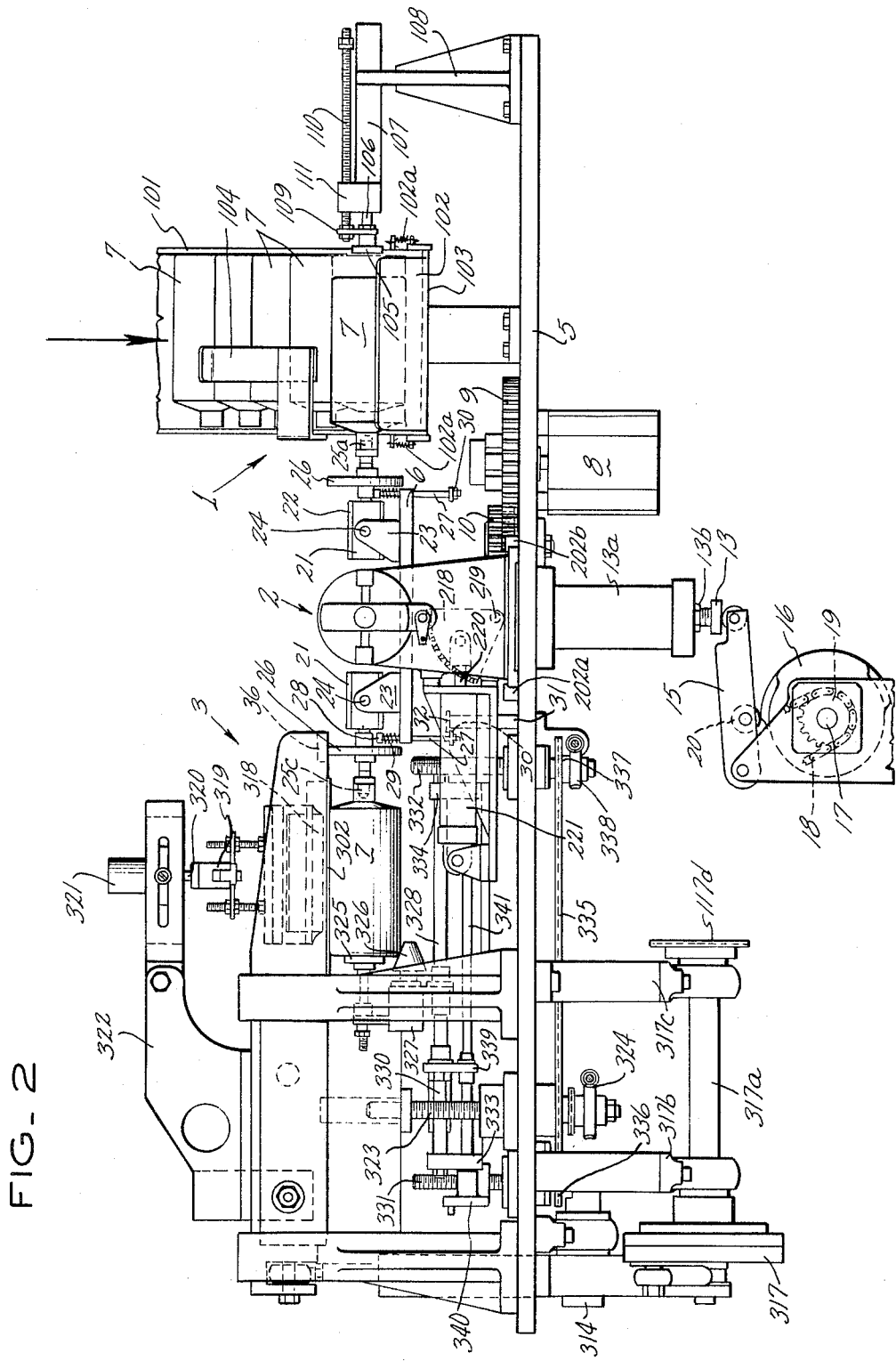
FIG. 2 is an enlarged elevational view of the system shown in FIGURE 1 as viewed from the side of the system including the article-registration component.

As illustrated, the mechanism is engaged in the printing of plastic, blow-molded bottles 7, having generally cylindrical body portions. A plurality of such bottles are consecutively supplied at the article feeding station 1 and are transferred to the turret 6. Turret 6, as shown in FIGURES 1 and 2, is intermittently advanced by means of an intermittent drive mechanism such as a conventional, schematically illustrated Ferguson drive unit 8. Drive unit 8 is operably engaged with the turret 6 through a drive-reduction train, including drive gears 9, 10 and 11, as illustrated in FIGURES 1, 2 and 10. Through the use of the drive reduction gearing, it is possible to provide a smooth, intermittent advancement of the turret 6. This may be accomplished, for example, by utilizing a six increment Ferguson drive unit which, through means of the reduction gearing train, effects a four increment turret advancement during each full turret rotation.

Gear 11 is rigidly secured to the turret 6 by means of a downwardly depending turret collar 12. A turret spindle 13 is journaled within collar 12 by means of bearing units 14 as shown in FIGURE 10. Spindle 13 is mounted for vertical reciprocating movement relative to frame 5 and telescopingly extends through a housing 13a. Spindle 13 is adapted to be vertically raised and lowered in predetermined sequence by an operating link 15 which is in turn actuated by a cam 16 driven by a drive shaft 17. Drive shaft 17 is rotated by a drive chain 18 extending from a main drive mechanism to engage a sprocket 19 rigidly affixed to drive shaft 17. To reduce the wear between the cam 16 and the operating link 15, a roller-type cam follower 20 is mounted on the link 15 to effect direct engagement with the camming surface of cam 16.

In FIGURE 2, spindle 13 is illustrated in its elevated position. This maximum elevation position of the spindle 13 and turret 6 may be adjusted by manipulation of a stop nut 13b which engages a stop surface on the lower end of housing 13a.

As cam 16 is rotated, turret spindle 13 is caused to move up and down in a predetermined sequence. Because of the axially slideable but geared interconnection between the turret gear 11 and the drive train gear 10, this reciprocation may take place without affecting the rotary drive connection between the turret 6 and the intermitent drive unit 8. As shown in FIGURE 10, gear 11 is in its maximum elevated position and still engaged with gear 10. When gear 11 is lowered, this engagement will be maintained.

The turret 6, in its preferred embodiment, includes four article support stations 21, equally and circumferentially spaced about the upper surface of turret 6. As shown in FIGURES 1 and 2, each article support station 21 comprises a support body 22 mounted for pivotable adjustment upon brackets 23 by means of schematically shown and conventional, adjustable pivot connections 24. A mandrel 25 is rotatably journaled in each support body 22. Each mandrel 25 is coaxially disposed with respect to its associated body 22 such that, when the body 22 is disposed in its normal horizontal position, the mandrel 25 extends horizontally and radially with respect to the axis of rotation of the turret 6.

Each mandrel 25 includes a drive wheel 26 adapted to frictionally engage a portion of the printing mechanism so as to effect rotation of mandrel supported articles during the printing operation. During turret advancement, however, each mandrel is held immobile. Such braking of the mandrels is effected by a brake rod 27 mounted on the turret 6 in association with each mandrel. Each rod 27 includes an upper brake pad 28. A coil spring 29 extends between pad 28 and the turret 6 to bias the rod 27 upwardly so as to bring the pad into frictional and braking engagement with the mandrel 25, as shown on the right side of turret 6 in FIGURE 2.

On the lower end of each brake rod 27 there is formed a brake release abutment 30. Rods 31 project upwardly from frame 5 to provide brake release detents 32 at the printing station 3 and the registration station 2. At these stations, as the turret is intermittently advanced, each brake release abutment 30 moves into alignment beneath a brake release detent 32. When the turret is elevated with the abutment and detent thus aligned, the brake rod 27 is moved downwardly relative to its associated mandrel 25 to free the mandrel 25 for rotation.

Loading station 1, as shown in FIGURES 1 and 2, includes a chute 101 which is downwardly inclined toward a mandrel 25a positioned at the loading station. The median plane of chute 101 is generally perpendicular to the axis of mandrel 25a as shown in FIGURE 1.

A plurality of bottles 7 are ranged in series to descend down the chute 101 toward the position of mandrel 25a. A gate 102 at the end of chute 101 is pivotally mounted about its lower edge 103 and is biased to an upwardly extending position by springs 102a so as to provide a yieldable chute detent. Gate 102, in this position, prevents bottles 7 from moving out of the lower end of the chute 101. A conventional guide 104 is provided to insure the smooth and aligned progression of articles toward the lower end of the chute 101.

In order to move individual bottles 7 out of the chute 101 and onto a mandrel 25a, there is provided a horizontally reciprocable pusher 105. Pusher 105 is mounted on a piston rod 106, which extends from a piston within a cylinder 107. Conventional fluid means act upon the piston within cylinder 107 to extend the piston rod 106 and its associated pusher 105. A bottle in the lower end of the chute 101 and the pusher 105 are axially aligned with the article receiving position of the mandrel 25a as shown in FIGURES 1 and 2. In this position, the turret 6 has been elevated to its upper position. With this alignment of the pusher 105, a bottle 7 in the lower end of the chute 101, and the mandrel 25a, article loading is effected merely by axially advancing the plunger 105 so as to push the neck opening of the bottle over a tapered end of the mandrel 25a. The neck portion of a bottle 7 is thus impaled upon the mandrel end as shown in FIGURES 2 and 9. When the turret is next advanced, the mandrel supported bottle will move against and open the yieldable chute detent 102. Detent 102 will quickly close after the mandrel supported bottle has moved out of engagement therewith so as to properly restrain and position a succeeding bottle.

As shown in FIGURE 9, each mandrel 25 includes a stop or abutment 33 for limiting inward movement of the neck of an article 7. To more positively secure an article 7 on a mandrel, spring loaded ball detents 34 are provided. An axial air passage 35 extends through each mandrel 25 to allow for the passage of air during a printing operation to achieve proper internal bottle or article support.

As shown in FIGURE 2, cylinder 107 is supported on a bracket 108 which, in turn, is mounted upon frame 5. An adjustable stop 109 determines the return position of the plunger 105. A threaded rod 10 extending through a threaded bracket portion 111 affords means for adjusting the position of stop 109.

Registration station 2 is illustrated in FIGURES 1, 2 and 3. Station 2 includes a registration plate 201 which is axially aligned with a mandrel 25b when it is in a bottle receiving position at the registration station. This alignment occurs when the turret 6 is in its elevated position.

Plate 201 is mounted for reciprocating movement toward and away from mandrel 25b. It is non-rotatably mounted within a housing 202 and includes a spring biased registration detent 203 adapted to cooperate with a registration recess 7a formed in the base of each bottle 7 as illustrated in FIGURE 4. A plurality of pivoted bottle gripping arms are arranged to be moveable to the dotted line position shown in FIGURE 3 to engage the periphery of the base of a bottle 7. When thus positioned, the arms 204 may be simultaneously rotated about the axis of plate 201 so as to rotate the gripped bottle 7 until its recess 7a is aligned with registration detent 203.

The arms 204 are provided at their outer ends with jaw members 205 for frictionally engaging the periphery of a bottle 7. Each arm 204 is pivotally joined to a hollow, rotary drive shaft 206 by means of a pivot pin 207. Each pivot pin is mounted upon a bracket 206a rigidly carried by shaft 206. Each arm 204 is also yieldably urged to the retracted position, shown in full lines in FIGURE 3, by a coil spring 208 extending from a connecting pin 209 on the arm 204 to a connecting pin 210 on an actuating collar 211.

Actuating collar 211 is keyed to shaft 206 and is peripherally grooved to receive inwardly directed projections 212 extending from actuating links 213. Actuating links 213 extend to a bracket 214 which is axially reciprocable in response to movement of a piston rod 215. Piston rod 215 extends from a piston contained within a cylinder 216 which is mounted upon housing 202.

As shown in FIGURE 3, a rod 217 extends from bracket 214 to coaxially and telescopingly pass through drive shaft 206 and rigidly engage plate 201. Thus, plate 201 and actuating collar 211 are simultaneously, axially reciprocable in response to movement of bracket 214. When an article 7 supported upon mandrel 25b is brought into axial alignment with but radially spaced from the registration station 2, the piston within cylinder 216 may be actuated by conventional control means to advance the piston rod 215 and bracket 214 so as to simultaneously move the registration plate 201 into engagement with the base of a bottle 7 and to move the collar 211 forward and thus pivot the arms 204 into engagement with the periphery of the base of the bottle.

Shaft 206, which supports the arms 204, is adapted to be yieldably rotated in response to movement of a sector gear 218. Sector gear 218 is pivotally journaled on stub axle 219. Gear 218 may be moved through an arcuate path by an actuating rod 220 extending from a fluid actuated piston contained within a pivotally secured cylinder 221, as shown in FIGURE 2. Actuating rod 220 is pivotally secured to sector gear 218 by a connecting pin 221.

Sector gear 218 engages a drive gear 222 mounted upon an intermediate drive shaft 223. Gear 222 is coupled to shaft 223 through a conventional, schematically illustrated, one-way clutch 224. In this manner, shaft 223 may be intermittently advanced in response to advancing movement of the sector gear 218. On the return movement of sector gear 218, intermediate shaft 223 is held stationary by a spring biased friction member 225, which engages the free end portion 226 of shaft 223. Rotation of friction member 225 is prevented by a restraining pin 225a which slideably engages member 225. The intermittent advancing movement of shaft 223 is transmitted to shaft 206 by a drive chain including a gear 227. Gear 227 engages a gear 228 which is rotatably mounted upon shaft 206 and coaxially secured with a plate member 229 of a friction clutch assembly. A second plate member 230 of this assembly is resiliently urged by a coil spring 231 toward the first plate member 229. A disk of friction material 232 interposed between the plates 229 and 230 provides for yieldable frictional engagement between the plates 229 and 230. Plate 230 is slideably secured to shaft 206 by key means 233. In this manner, intermittent rotary movement of clutch plate 229, as influenced by intermittent rotary advancement of the sector gear 218, is yieldably transmitted to the shaft 206. Due to the yieldable nature of the connection between plates 229 and 230, when the registration detent 203 becomes engaged with a registration recess 7a of a bottle gripped by the arms 204, rotation of shaft 206 will be interrupted, although movement of drive plate 229 may continue as a result of slippage between the plates 229 and 230.

As shown in FIGURE 3, shaft 206 is rotatably journaled within the housing 202 by means of bearing assemblies 234 and 235. As shown, shaft 206 is rotatable independently of reciprocable rod 217. As shaft 206 rotates, the projections 212 slideably move relative to the groove in the rotating collar 211.

Housing 202, is slideably mounted in tracks 202a and 202b on frame 5 in the manner illustrated in FIGURE 2. Accordingly, the position of the registration station may be radially adjusted with respect to turret 6 to accommodate a range of article or bottle lengths.

Printing station 3 is illustrated in FIGURES 1, 2 and 8. Station 3 includes a horizontally reciprocating frame 301 supporting a horizontally adjustable, conventional silk screen printing surface 302. Frame 301 is slideably mounted on horizontal rails 303 and 304 by means of a plurality of slidable collars 305. Rails 303 and 304 are supported on brackets 306 and 307 which, in turn, are mounted upon supporting members 308, 309, 310 and 311 which extend upwardly from frame 5.

As shown in FIGURE 8, frame 301 is horizontally reciprocated by an axially extensible arm 312. Arm 312 includes mutually telescopable portions 312a and 312b. Portion 312b is pivotally secured to frame 301 at pivot axis 313 while arm portion 312a is pivotally mounted to frame 5 at pivot axis 314. The lower end of arm 312 is pivotally connected to a crank arm 315, which crank arm extends to a connecting pin 316 eccentrically positioned upon a drive wheel 317. Drive wheel 317 is rotated by a drive shaft 317a extending from the main drive mechanism of the system. Shaft 317a is supported by brackets 317b and 317c and driven by a drive chain 317d. As shown in FIGURE 8, frame 301 may be oscillated between the illustrated position of arm 312 to the opposite, center line illustrated position.

A horizontally adjustable squeegee 318 is mounted above screen 302. Squeegee 318 is mounted upon a vertically adjustable and retractable frame 319 which is supported by a vertically reciprocable operating rod 320. Rod 320 in turn extends from fluid responsive piston contained within a cylinder 321. Cylinder 321 is supported upon a cantilever bracket 322 which is rigidly clamped upon rails 303 and 304 as shown in FIGURE 1.

During a printing operation the rod 320 is moved downwardly in response to an application of fluid pressure to the piston within cylinder 321 so as to bring the squeegee 318 into engagement with the printing surface 302. At the completion of a printing operation, the squeegee 318 is retracted by upward movement of the rod 320 so that the screen 302 may be returned to a printing initiating position without dragging across the squeegee.

As shown in FIGURES 1 and 2, rail supporting members 306 and 307 are arranged for vertical adjustment in supporting members 308, 309, 310 and 311 so that the elevation of surface 302 may be appropriately disposed in relation to the periphery of a bottle to be printed. Vertical adjustment of members 306 and 307 is effected by rotational movement of threaded adjusting rods 323, one of which is illustrated in FIGURE 2. Rods 323 are rotated by movement of drive gears 324 which in turn are driven by conventional adjusting mechanisms.

The horizontal position of printing surface 302 may be adjusted by transverse movement of a silk screen supporting frame including cross frame members 301a and 301b. Members 301a and 301b are slideably mounted upon rod type rails 301c and 301d and threadably connected thereto. The horizontal position of printing surface 302 may be manually adjusted by manipulation of a hand crank 301e. Crank 301e is connected with rail 301c. Rail 301c is operably connected to rail 301d by an interconnecting drive chain 301f. Thus, as crank 301e is manipulated, rails 301c and 301d are simultaneously rotated so as to advance the printing surface 302 axially along these rails.

A bottle supporting mechanism is provided at printing station 3 which includes a bottle end supporting plate 325 and a pair of bottle edge supporting, freely rotatable, conical rollers 326. Plate 325 and rollers 326 are mounted upon a body assembly 327 which, in turn, is mounted for sliding movement upon a pair of rails 328 and 329. A bracket 330 is mounted between rails 328 and 329 and supports a cylinder 330a which houses a fluid actuatable piston. The cylinder 330b is stationarily mounted upon bracket 330. A piston rod 330b extends between rails 328 and 329 to engage the slidable body assembly 327. As will be apparent, extension and retraction of this rod in response to fluid pressure application will be effective to move the assembly 327 and its associated plate 325 and rollers 326 axially along rails 328 and 329.

Assembly 327 is properly aligned with a mandrel 25c positioned at printing station 3, when the turret 6 is in its elevated position. Assembly 327 may be adjusted vertically to obtain its proper alignment relative to the diameter of a mandrel supported bottle by means of threaded adjusting rods 331 and 332. Rods 331 and 332 are threadably engaged with cross brackets 333 and 334, respectively, which support rails 328 and 329. Simultaneous movement of rods 331 and 332 is effected by means of a drive chain 335 which connects drive gears 336 and 337 mounted upon the lower ends of adjusting rods 331 and 332. As shown, threaded rods 331 and 332 are journaled within frame 5. A drive gear 338 extending from a conventional adjustment operating mechanism is effective to drive threaded rod 332 and to transmit driving force to rod 331 through the drive chain 335.

The normal or rest position of the assembly 327 may be adjusted by varying the position of the cylinder 330a as determined by its support bracket 330. This adjustment may be effected by moving an adjustment bracket 339 axially of rails 328. This movement may be manually effected by a crank 340 which manipulates an adjusting rod 341 which is threadably engaged with the adjusting bracket 339.

Cylindrical articles such as bottles 7 would be radially and horizontally oriented as illustrated in FIGURES 1 and 2 for the silk screen printing operation. Printing would be accomplished by rotating the bottle so that its periphery moved tangentially with the printing surface 302 and at the same speed as this surface. Conical articles could be printed by tilting the article supporting mandrel about the support axis 24 in a plane radial to turret 6 so as to bring the upper periphery of the article printing such conical surfaces, pursuant to recognized techniques, it may be desirable to move the surface 302 through an arcuate rather than a linear path.

The preferred manner in which mandrel supported bottles 7 are rotated during the printing operation is illustrated in FIGURE 2. As there shown, when the turret 6 is elevated, the friction disk 26 engages a friction bar 36 which extends along the forward edge of the printing frame 301. As the frame 301 is reciprocated along the rails 303 and 304, the friction bar 36, through engagement with the disk 26, causes rotation of the article supporting mandrel 25c at the printing station. The mechanism provides a more positive article rotating means than would result from mere frictional engagement between an article and the printing surface 302.

Transfer mechanism 4 is illustrated in FIGURES 1, 5, 6 and 7. As shown in FIGURE 1, the transfer mechanism includes a transfer arm 401 which is adapted to swing between a mandrel 25d to an outfeed conveyor 402. As shown in FIGURE 5, conveyor 402 comprises an endless belt having an outfeed flight 402a and an infeed flight 402b traveling on opposite sides of the conveyer frame 403.

The transfer arm 401 for swinging a bottle 7 supported on a mandrel 25d from its first, mandrel supported, position to a second, conveyer supported, position is shown in detail in FIGURE 5.

Transfer arm 401 includes a pair of article gripping arms 404 and 405. Arm 404 includes a bottle neck engaging jaw 406 at its free end. Arm 404 is pivotally mounted at its opposite end at pivot axis 407. A gear 408 is rigidly secured to gripper arm 404 and is mounted coaxial with pivot axis 407. An article engaging jaw 409 is positioned at the free end of gripper arm 405. The inner end of arm 405 is pivotally secured at a pivot axis 410. A gear 411 is rigidly secured to arm 405, concentric with pivot axis 410. Arms 404 and 405 are secured at pivot axes 407 and 410 to a bracket member 412.

A double toothed rack 413 extends between pivot axes 410 and 407 to engage gears 408 and 411 as shown in FIGURE 5. Double toothed rack 413 is reciprocated between these pivot axes by a piston rod 414 which extends from a piston 415 contained within a rotatable, cylinder-like housing 416. Piston 415 is biased by a coil spring 417 to a rightward position as shown in FIGURE 5. When a rack 413 is moved to its extreme right position, the gears 408 and 411 are rotated in opposite directions so as to move the arms 404 and 405 to a converged or closed position as shown in phantom lines. In this closed arm position, the article gripping jaws 406 and 409 cooperate to secure the neck of a bottle 7.

The release of the arms 405 and 404 from a bottle 7 is effected by applying fluid pressure to the actuating end of the piston 415. Such an application of fluid pressure is effective to move the piston 415 to the left so as to move the toothed rack 413 leftward and thus rotate the gears 408 and 411 so as to pivot the arms 404 and 405 to an open position. A conduit 418 extends from a convenient source of pressurized fluid to enable a selective and controlled application of fluid pressure to the piston 415 in coordination with the operation of the over-all mechanism as determined by a conventional control system.

Cylinder 416 is journaled in a portion 419 of arm 401 and is connected to bracket member 412 by threaded fasteners 412a. This journal assembly includes a sleeve 420 supporting a bearing 421 and a bearing assembly 422 which enable free rotation of the cylinder 416. Rightward movement of the cylinder 416 is prevented by engagement of cylinder flange 423 with a cooperating sleeve flange 424. Leftward movement of cylinder 416 is prevented by a securing nut 425 affixed to a projection of the cylinder 416, which nut engages the bearing assembly 422.

A crank arm 426 is affixed to the end of the cylinder 416 opposite to that to which the bracket 412 and the arms 404 and 405 are mounted. Crank arm 426 includes a cam follower 427 eccentrically mounted with respect to the gripping axis which extends axially of the cylinder 416 and intersects the axis of the closed arms.

As shown in FIGURES 5 and 6, arm portion 419 is pivotally mounted on a stub axle 428. Arm portion 419 is rigidly connected to an inclined arm portion 429 which extends downwardly away from stub axle 428. Swinging movement of the interconnected arm portions 419 and 429 about stub axle 428 is effected by manipulation of a crank arm 430. Crank arm 430 includes a connecting portion 431 slideably secured within a slot 429a extending longitudinally of arm portion 429. The end of the crank 430 opposite to that bearing the connecting portion 431 is rigidly connected to a rotary drive shaft 432. Drive shaft 432 projects from a conventional rotary hydraulic motor 433. It is contemplated that rotary motor 433 may comprise a conventional, oscillating vane type of hydraulic motor.

In order to provide for variations in the extent of swinging movement of arm portions 429 and 419, hydraulic motor 433 is adjustably mounted in trackways 433a and 433b which are secured to a frame portion 434. Frame portion 434 is slotted to receive an adjusting bracket 435 which extends to motor 433. Bracket 435 is threadably connected to an adjusting rod 436. Rotation of rod 436, in response to manipulation of an adjusting wheel 437, is effective to move bracket 435 within the slotted portion of frame 434 so as to vary the position of hydraulic motor 433. As will be appreciated, this variation in the position of motor 433 is effective to change the degree of swinging movement of the interconnected arm portions 419 and 429.

Cam follower 427 extends into a cam slot 438 formed in a cam plate 439. Cam plate 439 is supported by a frame member 440. As shown in FIGURES 6 and 7, cam slot 438 is irregularly configured. The configuration is designed to cause crank arm 426 to tilt with respect to arm portion 419 as arm portion 419 swings about the pivot axis 428. The cam track 438 is so configured as to cause the jaws 404 and 405 to withdraw an article generally radially from the mandrel 25d, to rapidly undergo a ninety degree reorientation so as to tilt the article to a vertical orientation, and to maintain this vertical orientation during the remainder of the swinging movement of the arm 419.

As shown in FIGURES 6 and 7, the crank arm is inclined so that the cam follower 427 is disposed between the mandrel 25 and the gripping, i.e. orienting, axis 441 of cylinder 416 and the gripper arm assembly. In the initial bottle removing position shown in FIGURE 7, follower 427 is disposed forward of a vertical plane extending downwardly from the axis 441.

The initial portion 438a of cam track 438 is flattened away from the normal arcuate path which would be followed by circular rotation of follower 427 about the pivot axis 428. In this manner, during the short initial movement of the arm 419 away from the mandrel 25d, the crank 426 is caused to rotate slightly clockwise as shown in FIGURES 6 and 7. This rotation counteracts the normal counterclockwise rotation of a transfer arm supported bottle which would result from the counterclockwise arcuate swinging movement of the arm portion 419 away from a bottle engaging position. This tilting of the crank arm relative to the arm portion 419 maintains a bottle 7 engaged by the closed jaws 406, 409 in a substantially horizontal orientation to effect its removal from the mandrel 425d. During this short initial movement the slight change in elevation of the axis of the bottle gripping assembly induced by the arcuate movement of the assembly will be so slight as to be inconsequential. It thus will be appreciated that the bottle 7 will be withdrawn from the mandrel 25d in substantially axial alignment therewith.

A second portion, 438b, of the cam track 438 is configured to effect a rapid reorientation of a gripper supported bottle 7. This reorientation comprises tilting the bottle through a ninety degree arc while the arm portion 419 moves through an acute angle, preferably on the order of forty-five degrees or less. This ninety degree reorientation, shown in phantom line in FIGURE 7, is effected by causing the cam track portion 438b to progressively approach the arcuate path traversed by the gripping axis 441 of the gripper assembly. As is apparent, this will cause the crank arm 426 to tilt counterclockwise in an accelerated fashion as the arm 419 moves counterclockwise through its swinging path. This accelerated tilting of the crank arm 426 is effective to reorient the gripped bottle 7 so that its longitudinal axis becomes vertically aligned while the arm 419 is in a mid portion of its swing path.

A third or terminal portion 438c of the cam track 438 is configured so as to maintain a gripper supported bottle 7 in its vertical orientation. This is accomplished by having the cam track portion 438c progressively separate from the arcuate path traversed by the jaw assembly axis 441. This configuration is effective to cause the crank to progressively rotate in a clockwise direction so as to counteract the normal counterclockwise rotation of a bottle 7 which would be induced by moving it through a counterclockwise arcuate path while rigidly supported by the gripper assembly.

By reorienting a bottle 7 while the arm 419 has moved through an acute angle away from the mandrel 25d, and by maintaining the vertical orientation of the bottle, positioning of a printed bottle 7 on the outfeed conveyor flight 402a is facilitated. The reorientation of a bottle 7 into a position of vertical alignment before the arm 419 has completed its swinging movement enables the transfer arm to accommodate bottles of varying axial length without adjusting the position of outfeed conveyor flight 402a. Proper orientation of the bottle for direct deposit upon the conveyor flight 402a in vertical orientation is achieved during the early portion of the swinging movement of the arm 419. Thereafter this orientation is maintained so that engagement may be effected between the bottle and the conveyor flight 402a at any time, independent of the position of flight 402a and the length of a bottle 7.

With all operating components of the mechanism having been described in detail, the over-all operation of the system may now be examined.

A bottle 7 at the lower end of chute 101 is in position for loading on mandrel 25a. With the turret indexed to the position shown in FIGURE 1, and elevated to its upper position, a mandrel and the bottle to be loaded are axially aligned. When the pusher 105 is extended, the bottle is loaded upon the end of the mandrel as shown in FIGURE 2. After the bottle is loaded upon a mandrel, the turret is lowered while being indexed ninety degrees so as to advance the bottle to the registration station 2. As the bottle reaches the registration station 2, the turret is elevated so as to bring the bottle into axial alignment with the registration mechanism. The raising of the turret is effective to free the mandrel brake so that the bottle is capable of being rotated. The bottle is gripped by the arms 204, while the registration detent engages the bottle base, and rotated by the arms so as to obtain a bottle alignment suitable to receive printing indicia.

When the bottle was brought into alignment with the registration station, the brake release abutment 30 associated with brake rod 27 moved beneath a release detent 32 at the registration station. As the turret was elevated to align the bottle with the registration components, the brake rod 27 was moved downwardly relative to the mandrel so as to free the mandrel and bottle for rotational movement.

After completion of the registration step, the turret again advances and moves downwardly so as to bring the bottle 6 to the printing station 3. During the advancing movement, the mandrel brake is effective to prevent mandrel and bottle rotation. With the bottle at the printing station, the turret is again elevated so as to align the bottle with the various printing components and to again operate the brake rod 27 so as to free the mandrel for rotation. With the turret aligned with station 3 and elevated, the bottle support assembly comprising the end support plate 325 and the conical rollers 326 are moved forward to engage and support the free bottle end. Air is injected through the mandrel to support the cylindrical bottle wall during the printing operation. The printing surface 302 may then be moved transversely of the mandrel so as to effect the transfer of indicia to the outer periphery of the bottle. Consistent with conventional techniques, when the turret is elevated the bottle would be slightly spaced below the surface of printing screen 302. Before the screen 302 is moved laterally to effect printing, the squeegee 318 is depressed through actuation of the piston rod 320 so as to force the screen into indicia transferring engagement with the periphery of the bottle.

The drive wheel 26 associated with the mandrel 25 is brought into frictional engagement with the drive bar 36 when the turret is in its fully elevated position. As the screen frame 301 is traversed to move the silk screen printing surface 302, the mandrel is caused to rotate as a result of the driving influence of drive bar 36 so that the periphery of the bottle moves tangentially with and at the same speed as the printing surface 302 to effect a formation of printed indicia on the periphery of the bottle by the usual silk screen process.

At the completion of the printing operation, the turret moves downwardly and is advanced so as to bring the bottle to the transfer station 4. At this station, the turret is again elevated so as to bring the bottle into alignment with the bottle gripping assembly, including gripping arms 404 and 405. Arms 404 and 405 are then actuated by toothed rack 413 so as to bring the gripping jaws 409 and 406 into engagement with the neck of the bottle. Swinging movement of the arm portion 419 is then initiated so as to move the bottle generally axially off of the mandrel 25, and reorient the bottle so that its axis is vertically aligned for appropriate depositing upon the conveyer flight 402a.

As will be appreciated, the article loading, article registration, article printing and article transfer steps are concurrently effected while the turret is in its elevated position. The sequence of operations of individual components of the system may be coordinated by conventional control mechanisms.

In describing the structural nature and operating details of the various components of the printing and article handling mechanism, the several advantages of the invention have been demonstrated. The horizontally rotatable turret and the radial disposition of work stations enables direct observation of the entire article handling and printing operation. Convenient access is provided to all components of the system for purposes of adjustment and maintenance. The vertical dimensions of the apparatus are minimized so as to enable the over-all mechanism to be readily utilized in working areas where vertical working space may be at a premium. The radial disposition of components at substantially the same level further contributes to ease of operation, adjustment and maintenance. The necessity of moving to substantially different elevations to effect adjustment or maintenance operations is avoided. The over-all maintenance of radial manipulative steps, the use of the turret to transport articles between work stations, and the simultaneous performance of working operations at all work stations enables a rapid article handling and printing operation.

The article mounting arrangement is especially advantageous, particularly where cylindrical articles are being handled. Once mounted on mandrels adjusted to extend radially of the turret axis, such cylindrical articles are disposed with their central or cylindrical axis extending radially of the turret axis and maintain their axial orientation throughout the entire system. As will be appreciated, this contributes to the obtaining of a high speed operation and avoids errors which would inherently tend to result from repeated article reorienting. Thus, the present arrangement increases both the speed and accuracy of the overall article handling and indicia-forming operation. The radial disposition of work stations at the same working elevation which are provided with radially operable components further contributes to this improved mode of operation.

Due to the accessible and dispersed character of the various components of the system, and the use of radial article mounting and manipulation steps, the system may be readily and conveniently accommodated to a wide variety of article dimensions.

The utilization of a mandrel brake mechanism which is operable in response to turret and printing means convergence and separation affords a structurally simple, highly reliable arrangement for controlling article rotation without introducing operational delays. The unique article transfer structure incorporated in the mechanism facilitates the transfer of articles of varying shapes and lengths to a conveyer without the necessity of adjusting the position of the conveyer to individual requirements. The disclosed article orienting mechanism in and of itself introduces operating advantages. Its compact character achieves a substantial space savings. It may rapidly be engaged by a mere radial movement with a mandrel supported article and manipulated without affecting the article supporting arrangement. Thus, registration may be both accurately and expeditiously achieved.

The over-all structural nature of the apparatus avoids the complexities of prior art structures which reduce operating speed, create complexities in printing and article handling operations, and aggravate maintenance problems.

While the over-all mechanism has been described with reference to preferred embodiments of the individual components, it will be readily apparent to those skilled in the art that certain alternative structural details and operating sequences may be employed. For example, indicia forming means other than the disclosed silk screen printing unit may be utilized. A turret advancing and elevating system other than that disclosed may be conveniently incorporated in the system. Under certain circumstances it may be desirable to move the printing mechanism toward turret carried articles rather than to move the turret and articles toward the printing mechanism as described. A registration structure other than the specific disclosed structure may be employed. For example, article grippers other than the illustrated pivoted arms might be utilized. Under certain circumstances, the registration unit may be altogether eliminated. Where a mandrel brake is employed, it may be substantially different from that disclosed and illustrated. Turret carried, article supporting structures different from those illustrated may be acceptable for certain indicia-forming and article requirements. Similarly, an indicia-forming operation other than that disclosed may be required, depending upon the nature of the indicia to be formed and the configuration of the articles to receive such indicia.

While a variety of modifications may be made with respect to the disclosed system components and their operating characteristics, the over-all scope of the invention is deemed to be defined in the appended claims.

We claim:

1. An apparatus for forming indicia on articles, said apparatus comprising:

a rotatable turret;

a plurality of article supports circumferentially spaced on said turret;

indicia forming means spaced from said turret;

means for effecting relative convergence and separation of said turret and said indicia forming means in coordination with rotation of said turret, said convergence being adapted to successively and automatically bring each article carried by an article support into indicia-receiving relationship with said indicia-forming means whereby said article may be rotated about an axis to move in indicia-forming contact with said indicia-forming means;

means adjacent but independent of said rotatable turret for sequentially engaging articles carried by said article supports and causing each article so engaged to be individually rotated and suitably positioned to be subsequently brought into indicia-receiving relationship with said indicia-forming means through convergence of said turret and said indicia-forming means;

said means for sequentially engaging articles being positioned relative to said rotatable turret so as to be engageable with an article carried by one article support while another article carried by another article support is in indicia-receiving relationship with said indicia-receiving means;

conveyor means for transporting articles having generally arcuate body portions to said apparatus and for successively positioning individual articles with central axes thereof extending toward, and lying in a plane extending generally radially of, the axis of rotation of said turret;

linearly reciprocable article loading means for successively engaging articles to cause each article to move continuously off of said conveyor means and onto an article support, with a central axis of each article remaining in said radially extending plane; and article unloading means for moving an article generally radially of said turret to separate it from an article support.

2. An apparatus as described in claim 1 wherein each said article support comprises a mandrel which extends radially of said turret to receive an article, and wherein said article loading means comprises a plunger mounted for radial reciprocating movement relative to the axis of rotation of said turret for pushing an article axially of and onto said mandrel.

3. An apparatus as described in claim 1 wherein said article support comprises a mandrel adapted to axially engage an article end to radially support the article and wherein said means for sequentially engaging articles includes driving means mounted to move toward a mandrel supported article to engage its free end and then rotate said article about the mandrel axis, said means for sequentially engaging articles further including registration means mounted to move generally axially of said mandrel supported article to engage its free end and interrupt its rotation when it has attained a predetermined position suitable to receive indicia.

4. An apparatus as described in claim 1 including means for rotating an article supported with its central axis aligned with a plane extending radially of said turret when said turret and said indicia forming means have been converged to bring an article into indicia receiving position whereby said article is moved in indicia-forming contact with said indicia-forming means.

5. An apparatus as described in claim 1 including brake means associated with each said article support and adapted to prevent rotation of an article carried thereon, and further including brake release means operable in response to convergence of said turret and said indicia forming means.

6. An apparatus as described in claim 1 wherein each of said article supports is pivotably mounted so as to be inclinable relative to the plane of rotation of said turret whereby articles carried by said supports may be sequentially brought into indicia receiving position as a result of relative convergence of said turret and said indicia forming means.

7. An apparatus as described in claim 1 wherein each said article support comprises a mandrel which extends radially of the axis of rotation of said turret for separation of an article carried thereby and wherein said article unloading means comprises an article gripping means for engaging said article to move it axially of said mandrel to separate it therefrom.

8. An apparatus for forming indicia on articles, said apparatus comprising:
a rotatable turret;
a plurality of article supports circumferentially spaced on said turret, each said article support comprising a mandrel which extends radially of the axis of rotation of said turret for separation of an article carried thereby;
indicia forming means spaced from said turret;
means for effecting relative convergence and separation of said turret and said indicia forming means in coordination with rotation of said turret, said convergence being adapted to successively and automatically bring each article carried by an article support into indicia-receiving relationship with said indicia-forming means, whereby said article may be rotated about an axis to move in indicia-forming contact with said indicia-forming means;
conveyor means for transporting articles having generally arcuate body portions to said apparatus and for successively positioning individual articles with central axes thereof extending toward, and lying in a plane extending generally radially of, the axis of rotation of said turret;
linearly reciprocable article loading means for successively engaging articles to cause each article to move continuously off of said conveyor means and onto an article support, with a central axis of each article remaining in said radially extending plane; and
article unloading means for moving an article generally radially of said turret to separate it from an article support, said article unloading means including
arm means mounted for swinging movement between said mandrel and an article conveyor,
an article gripping means carried on said arm means for engaging said article to move it axially of said mandrel to separate it therefrom,
support means for said article gripping means, said support means being journaled in said arm means and having a crank arm,
a cam follower carried by said crank arm, and
a stationary cam engaging said cam follower, said stationary cam having a portion adapted to tilt said crank arm ninety degrees to incline an article ninety degrees while said arm means moves through an acute angle.

9. An apparatus for printing indicia on articles said apparatus comprising:
a turret having a vertical axis of rotation;
a plurality of article supports circumferentially spaced on said turret, each article support comprising a mandrel having an axis which extends horizontally in a plane radial to said turret to receive and discharge an article;
a plunger mounted for horizontal reciprocating movement relative to said turret for pushing an article axially of and onto a mandrel of an article support;
means for rotating an article supported on a mandrel and registration means for interrupting said rotation of said article when it has attained a predetermined position suitable to receive printed indicia;
screen printing means positioned above the movement path of articles carried by the mandrels of said article supports;
means for elevating said turret to bring an article carried by a mandrel into indicia receiving position relative to said screen printing means and for lowering said turret after indicia have been printed on said article;
means for rotating an article supported on a mandrel about an axis aligned with a plane extending radially of said turret when said turret has been raised to bring said article into indicia receiving relation with said screen printing means;
brake means associated with each mandrel and adapted to prevent rotation of an article carried thereon, and brake releasing means operable in response to said elevating of said turret;
and article unloading means for engaging an article supported on a mandrel to move it generally axially off of said mandrel.

10. An apparatus as described in claim 9 wherein said article unloading means comprises:
arm means mounted for swinging movement between a mandrel and an article conveyor;
article gripping means carried on said arm means;

support means for said article gripping means, said support means being journaled in said arm means and having a crank arm;
a cam follower carried by said crank arm;
and a stationary cam engaging said cam follower, said stationary cam having a first portion adjacent said mandrel and adapted to tilt said crank arm relative to said arm means during the initial portion of the swinging movement of said arm means so as to maintain an article engaged by said gripping means in a substantially horizontal orientation and remove it from a mandrel, having a second portion adapted to tilt said crank arm ninety degrees, while said arm means moves through an acute angle, to incline said article ninety degrees into a vertical orientation, and further having a third portion adapted to tilt said crank arm relative to said arm means during the terminal portion of the swinging movement of said arm means so as to maintain said article in a vertical orientation until it reaches said article conveyor.

11. An apparatus for transferring an article from one position to another, said apparatus comprising:
arm means mounted for swinging movement between two article positions;
article gripping means carried on said arm means;
support means for said article gripping means, said support means being journaled in said arm means and having a crank arm;
a cam follower carried by said crank arm;
and a stationary cam engaging said cam follower, said stationary cam having a portion adapted to tilt said crank arm ninety degrees, while said arm means moves through an acute angle, to incline said article ninety degrees with respect to its first position.

12. An apparatus for transferring an article from one position to another, said apparatus comprising:
arm means mounted for swinging movement between two article positions;
article gripping means carried on said arm means;
support means for said article gripping means, said support means being journaled in said arm means and having a crank arm;
a cam follower carried by said crank arm;
and a stationary cam engaging said cam follower, said stationary cam having a first portion adjacent one article position adapted to tilt said crank arm relative to said arm means during the initial portion of the swinging movement of said arm means so as to maintain an article engaged by said gripping means in substantially the same axial orientation as that which it had at said first position, having a second portion adapted to tilt said crank arm ninety degrees, while said arm means moves through an acute angle, to incline said article ninety degrees with respect to its first position, and further having a third portion adapted to tilt said crank arm relative to said arm means during the terminal portion of the swinging movement of said arm means so as to maintain said article in a position inclined at an angle of ninety degrees to said first article position until it reaches a second article position.

13. An apparatus as described in claim 12 wherein said article gripping means includes a pair of pivoted jaws, said apparatus further including gear means rigidly associated with each of said jaw means and coaxial with the pivot points thereof, a toothed rack engaging said gear means, a spring biasing said rack to cause it to so rotate said gear means as to pivot said jaws to a converged position, and a piston rigidly associated with said rack and adapted to so move said rack as to separate said jaws.

14. An apparatus for registering an article, said apparatus comprising:
a mandrel adapted to axially engage an article end to radially support the article;
driving means mounted to move toward a mandrel supported article to engage its free end and then rotate the article about the mandrel axis;
and registration means mounted to move generally axially of a mandrel supported article to engage its free end and interrupt its rotation when it has attained a predetermined position suitable to receive indicia.

15. An apparatus as described in claim 14 wherein:
said driving means comprises
a sector gear,
a fluid actuated piston for oscillating said sector gear,
a one-way clutch driven by said sector gear,
a friction clutch driven by said one-way clutch,
a hollow shaft driven by said friction clutch,
and a plurality of pivoted arms carried by said hollow shaft adapted to converge upon and grip an article free end,
said registration means comprises
a plate adapted to engage the base of an article at its free end,
a yieldable detent mounted on said plate adapted to engage a registration recess in the base of said article,
and an operating rod telescopingly mounted with said hollow shaft of said driving means,
and said apparatus includes
means for concurrently moving said operating rod and pivoting said arms so as to bring said plate and said arms into engagement with the free end of said article.

16. An article transfer mechanism being supported on frame means and, said mechanism comprising:
transfer means mounted on said frame means for oscillating movement;
article carrying means spaced from the oscillation axis of said transfer means and mounted on said transfer means for oscillation about an orienting axis parallel to the oscillation axis of said transfer means;
drive means for oscillating said transfer means;
article position governing means including;
means for rotating said article carrying means about said orienting axis, relative to said transfer means, during the initial portion of rotating movement of said transfer means in one direction so as to maintain said article carrying means substantially parallel with its initial position,
means for reorienting each article carried by said article carrying means, relative to said frame means, during an intermediate portion of said rotating movement of said transfer means by affecting the rotation of said article-carrying means about said orienting axis whereby an axis of each said article carried by said article-carrying means becomes inclined in relation to the orientation of said article axis during said initial portion of said rotating movement of said transfer means, and
means for maintaining said article carrying means in its reoriented position for the terminal portion of said rotating movement of said transfer means.

References Cited by the Examiner
UNITED STATES PATENTS

| | | | |
|---|---|---|---|
| 2,484,671 | 10/1949 | Bauman | 101—115 |
| 2,690,118 | 9/1954 | Schwartz et al. | 101—115 |
| 2,885,957 | 5/1959 | Hansen | 101—124 |
| 2,950,671 | 8/1960 | Allen et al. | 101—40 |
| 3,066,786 | 12/1962 | Allgeyer | 214—1 |

ROBERT E. PULFREY, *Primary Examiner.*

WILLIAM B. PENN, *Examiner.*